Nov. 5, 1963   E. L. MATTSON   3,109,919
WELDING METHOD AND APPARATUS
Filed Aug. 27, 1959   4 Sheets-Sheet 1

INVENTORS
EVERETT L. MATTSON
BY
Wheeler, Wheeler & Wheeler
ATTORNEYS.

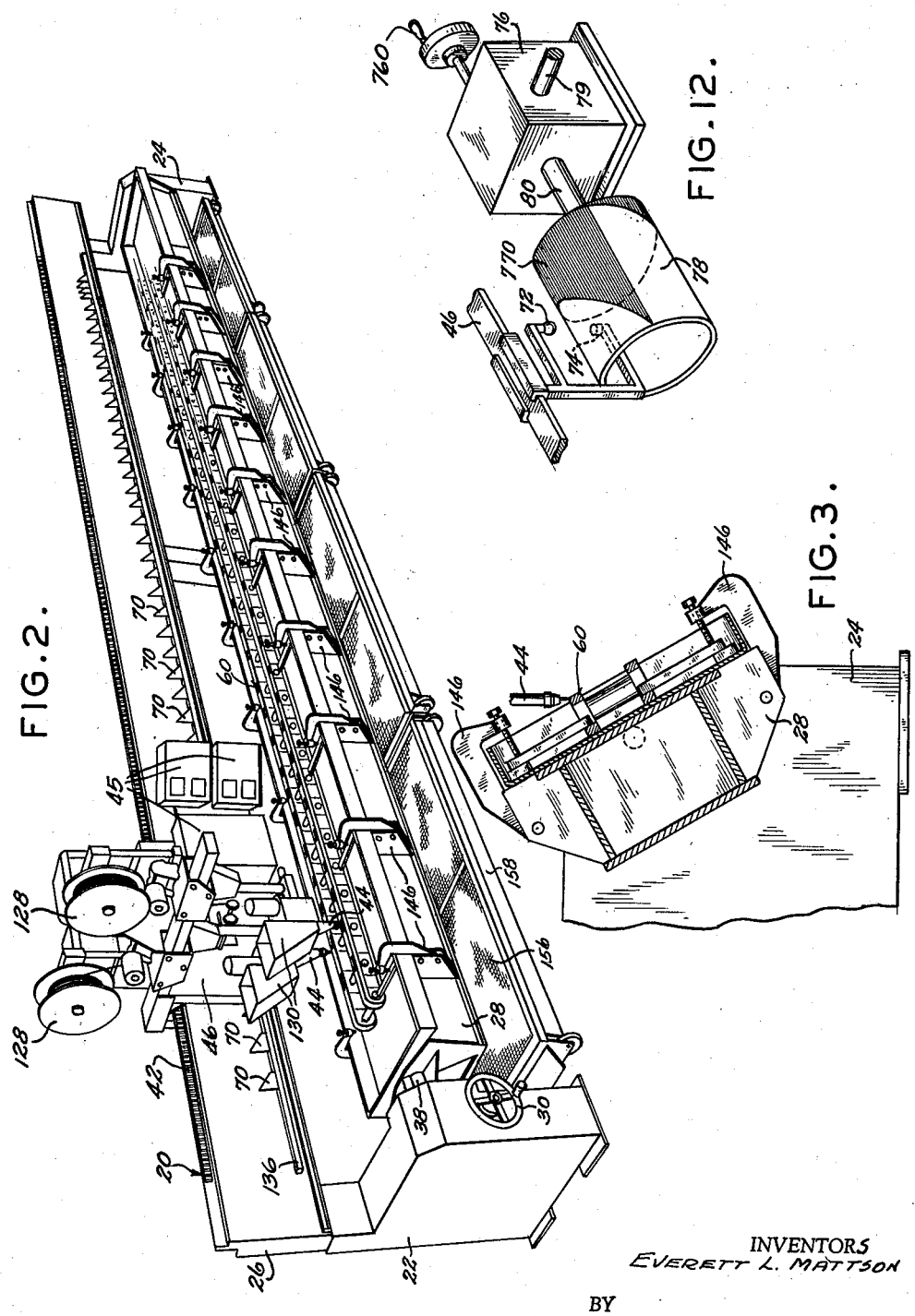

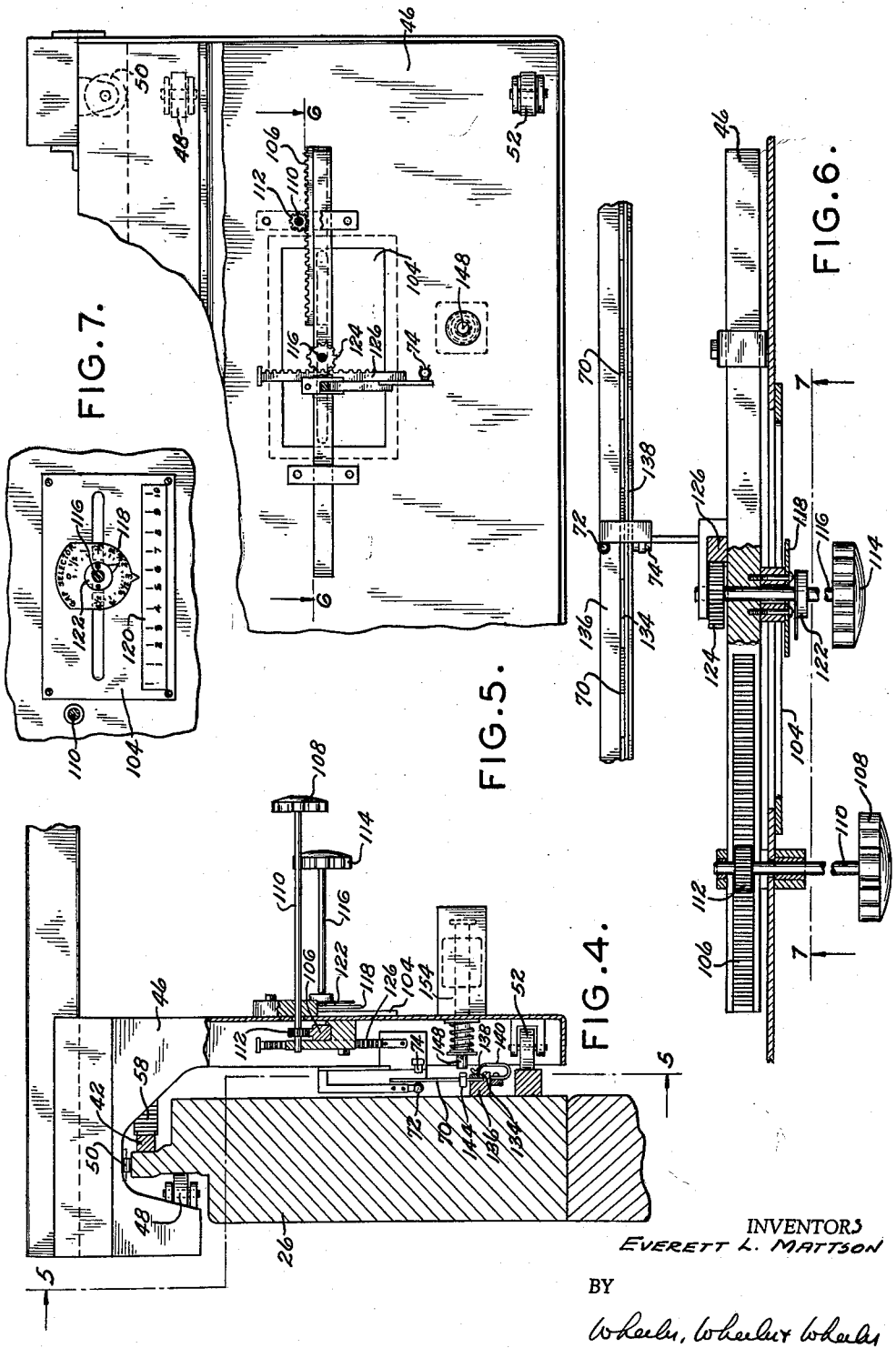

Nov. 5, 1963
E. L. MATTSON
3,109,919
WELDING METHOD AND APPARATUS
Filed Aug. 27, 1959
4 Sheets-Sheet 4
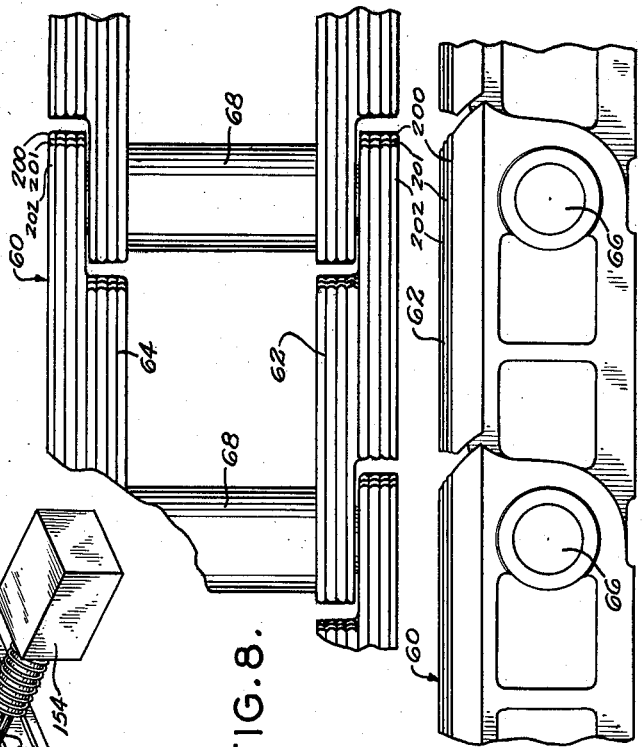
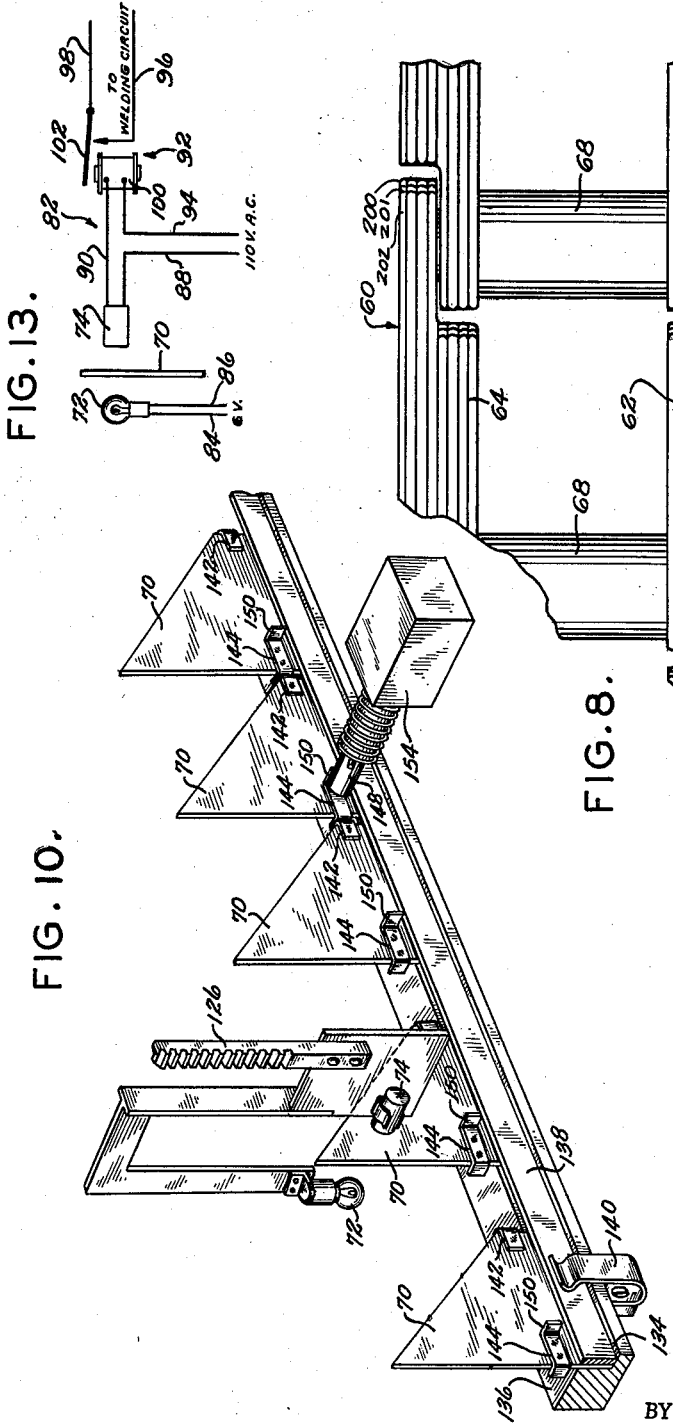
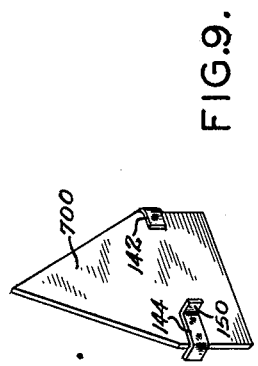
INVENTOR.
EVERETT L. MATTSON
BY
Wheeler, Wheeler & Wheeler
ATTORNEYS United States Patent Office
3,109,919
Patented Nov. 5, 1963

3,109,919
WELDING METHOD AND APPARATUS
Everett L. Mattson, Brookfield, Wis., assignor to Automatic Welding Company, Waukesha, Wis., a corporation of Wisconsin
Filed Aug. 27, 1959, Ser. No. 836,370
4 Claims. (Cl. 219—125)

This invention relates to welding apparatus and more particularly to welding positioner and manipulator.

The present invention provides a machine for positioning and manipulating lengths of material upon which weld metal is being deposited. A bed is provided on the machine which is arcuately indexable through 360° and in which the material to be welded is placed. A flux container and depositor is provided to submerge the arc of each welder and a flux screener and catcher separates fused material from reusable flux when the bed is indexed and dumped. Automatic welding heads are mounted on a carriage and are movable above the material along the length of a beam forming a part of the machine frame. Controls are provided including at least one template which can be positioned automatically in accordance with the configuration of the piece to be welded. The template subsequently controls the welding heads to deposit the weld metal according to a pattern established by the template.

A machine of the type described is particularly useful for depositing hard surface weld metal upon the links which support and carry the tracks of a tracked vehicle. The links wear substantially as a result of their continual travel over guide rollers. It is an important object of this application to produce such a resurface welding machine which requires the minimum possible operators' time to set up and operate whereby resurfacing becomes more attractive than replacement because of the low cost. While a machine of this type is illustrated in the preferred embodiment, it is to be understood that the salient features of the invention are not limited thereto but might be used on other machines such as pipe seam welders.

In the drawings:

FIG. 2 is a perspective view of the machine shown in FIG. 1 showing its entire length;

FIG. 3 is a fragmentary transverse section through the machine showing the bed indexed;

FIG. 4 is a fragmentary view partly in elevation and partly in transverse cross section of the control carriage and its mounting arrangement on the frame;

FIG. 5 is a fragmentary cross-sectional view taken along line 5—5 of FIG. 4;

FIG. 6 is a fragmentary cross-sectional view taken along line 6—6 of FIG. 5;

FIG. 7 is a fragmentary cross-sectional view taken along line 7—7 of FIG. 6;

FIG. 8 is a fragmentary top view of a section of track links;

FIG. 9 is a side elevational view of FIG. 8;

FIG. 10 is a fragmentary perspective view showing the relationship between a series of templates and a photoelectric unit;

FIG. 11 is a perspective view of a second embodiment of a template;

FIG. 12 is a perspective view of a further embodiment usable alternatively with the embodiment illustrated in FIG. 10; and FIG. 13 is a schematic illustration of the circuitry between the photoelectric unit and the welding head.

Figure 1:
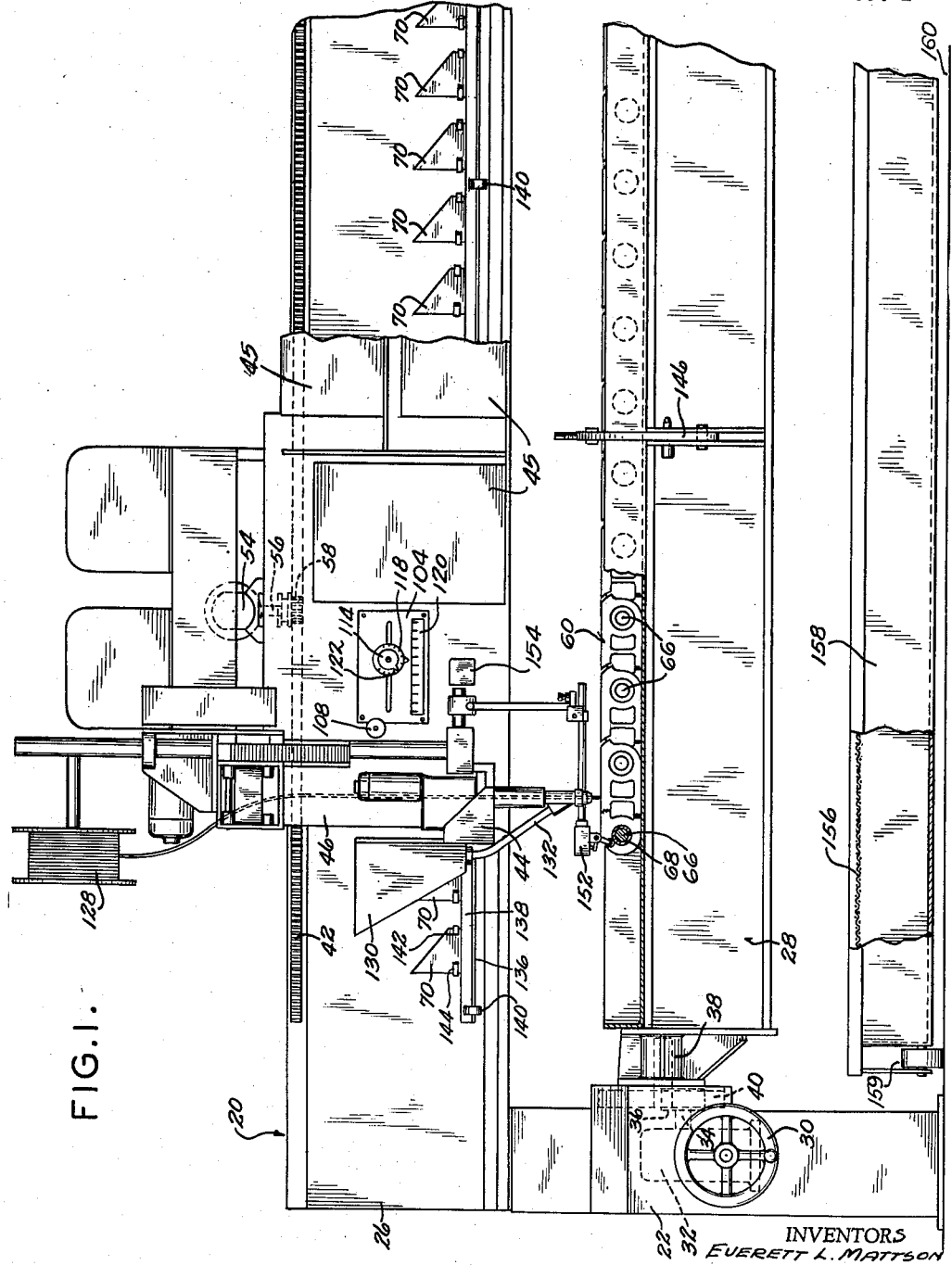
FIG. 1 is a frontal elevational view of a portion of a machine embodying the present invention.

A welding positioner and manipulator is shown in FIGS. 1 and 2, indicated generally by the number 20.

The machine has a pair of upright frame members 22 and 24 interconnected by a horizontal frame member 26.

Rotatably suspended between frame members 22 and 24 is a welding bed 28. Frame member 22 has a hand wheel 30 journaled therein on a shaft which extends into a gear box 32. A shaft 34 extends out of gear box 32 at right angles to the shaft of the hand wheel 30 and transfer gear 36 is mounted thereon. At each end of welding bed 28 a shaft protrudes which is journaled in one of the frame members 22 and 24. Only one such shaft 38 is shown journaled in frame member 22. Shaft 38 has mounted at the end within frame member 22 a gear 40 which is in driving engagement with transfer gear 36. Manipulation of hand wheel 30 will be transferred through gear box 32 to welding bed 28 indexing the welding bed arcuately through 360° in either the clockwise or counterclockwise direction.

A view of welding bed 28 indexed through a portion of 360° is shown in FIG. 3 which also illustrates one of the purposes for the indexing of the bed.

A rack 42 extends along the top of horizontal frame member 26. Welding heads 44 including controls 45 form a portion of the carriage 46 shown in detail in FIGS. 4 and 5. Carriage 46 is supported from frame member 26 by rollers 48, 50 and 52. The carriage is thereby firmly supported while still being easily portable. In FIG. 1 there is schematically illustrated an electric motor 54 for driving carriage 46. A shaft 56 extends downwardly from motor 54 and a gear 58 is mounted at the end of the shaft 56 remote from motor 54 in engagement with rack 42. Electric motor 54 is reversible, thereby driving carriage 46, through the drive arrangement described, in either direction desired along frame member 26 the extent of rack 42.

The purpose of a machine of the type illustrated is to deposit weld metal upon the surface of an article placed in welding bed 28. As an example of such an article, a segment of a chain 60 is shown in FIGS. 8 and 9 having rails 62 and 64 connected by pins 66 in sleeves 68. The chain 60 shown is illustrative of the chain which supports the cleats of a tracked vehicle. After the chain has been opened by removing one of the pins 66 and the corresponding sleeve 68 the chain may be laid out flat with the cleat-supporting surface of the chain facing downwardly as it is viewed in FIG. 9. This leaves the inner surfaces of rails 62 and 64 facing upwardly. It is desirable to preserve the life of the chain used in such a manner by rebuilding it to its original dimensions through depositing weld metal upon the worn surfaces of the rail. It is particularly desired by applicant that notice be taken of the gaps between successive links which must be maintained in order that the chain links be capable of pivoting relative to each other. It is also desired that notice be taken of the fact that the inside rail gap is offset from the outside rail gap. For this purpose templates 70, 700 and 770 are provided.

It will be noted that FIGS. 10, 11 and 12 each disclose a slightly different type of template 70, 700 and 770, all of which perform the operation required in an acceptable manner, but the template 70 illustrated in FIG. 10 is preferred.

Because the tracks of tracked vehicles made by various manufacturers differ in the lengths of the links and the gaps between links, it is necessary that the means of setting up an automatic welding pattern be universally usable on all the varieties of tracks so that the time of the operator is not wasted in changing templates or patterns between welding operations. Two embodiments for doing this are illustrated in FIGS. 10 and 12.

FIG. 10 discloses a plurality of triangularly-shaped templates 70 which can be positioned to register with respective gaps between successive links of the track. A light 72 and photoelectric cell 74 are caused to pass on opposite sides of the templates 70 as carriage 46 travels the length of rack 42. The light beam is alternately picked up by photoelectric cell 74 completing the welding circuit illustrated in FIG. 13 and depositing weld metal and interrupted by the template 70 breaking the circuit and discontinuing the deposit of weld metal. Light 72 and photoelectric cell 74 are supported from carriage 46.

FIG. 12 illustrates a gear-reduction unit 76 of a well known type driven from motor 54 through shaft 79 having a clear plastic drum 78 mounted on the output shaft 80 thereof. Drum 78 has a triangularly shaped template 770 on its surface. A handle 760 is provided to adjust the rotation of drum 78 to the track to be welded. The drum 78 may be rotated at the ratio of one revolution for each link of track by adjusting gear reduction unit 76. A photoelectric cell 74 and light 72 are adjustably mounted on carriage 46 and cell 74 extends into the open end of drum 78 any desired distance so that the rotation of the drum 78 will cause the template 770 on its surface to pass between the light 72 and photoelectric cell 74 at exactly the point where the welder 44 travels over the gap between successive links controlling the welding circuit in the manner described with reference to FIG. 10.

Template 700 shown in FIG. 11 is interchangeable with template 70 of FIG. 10 but template 70 has advantages over templates 700 and 770 which will be subsequently explained.

The welding circuit 82 illustrated in FIG. 13 schematically shows a light 72 having a pair of wires 84, 86 extending to a source of electricity (not shown). A photoelectric cell 74 is connected to a 110-volt alternating current source (not shown) by a wire 88 and another wire 90 extends to a magnetic switch 92. A third wire 94 extends from the 110-volt alternating current source to switch 92. Reception of the light beam by the photoelectric cell 74 completes the circuit between the photoelectric cell 74, the 110-volt alternating current source and the magnetic switch 92 energizing switch 92 to close thereby completing the welding circuit composed of wires 96, 98 running to welding heads 44 actuating them to deposit weld.

Interruption by a template 70 of the beam of light between the light source and the photoelectric unit such as illustrated in FIG. 13 will break the circuit deactuating magnet 100 releasing switch contact 102, deactuating the welding heads 44 and discontinuing the deposit of weld metal. This operation will be repeated as many times as the light beam received by the photoelectric cell 74 is broken by a template 70 as the carriage 46 travels down the length of frame member 26. Carriage 46 has a control panel 104 mounted thereon through which are mounted controls for advancing and retarding the interception of the light 72 by the templates 70 and for raising and lowering the light 72 with respect to the templates 70 to adjust the widths of the gaps between links.

Referring particularly to FIGS. 4–7, it can be seen that a rack 106 is provided on the back of the control panel 104, through which shaft 110 extends. This shaft carries control knob 108. A gear 112 is mounted on the end of the shaft 110, remote from knob 108. This gear engages the rack 106 and moves it to the left or right as desired by the operator. A knob 114 is mounted on a second shaft 116 which extends through a slot in panel 104 and is journaled through a gap selector pointer 118 into rack 106. The pointer 118 points at a scale 120 marked off in increments as desired whereby as knob 108 is adjusting the rack 106, the pointer 118 through which the shaft 116 is journaled will slide back and forth along the slot to indicate on the scale 120 the advance or retard which the operator is securing by adjusting the photoelectric unit 72, 74 with respect to the templates. Knob 114 has a pointer 122 which operates in conjunction with a series of increments marked off on the scale shown on the gap selector pointer 118 whereby after the advance or retard is indicated by the gap selector 118, knob 114 will raise or lower the photoelectric unit 72, 74 with respect to the template 70 to select the desired increment of gap between successive links. Increasing or decreasing of the gap is accomplished by raising or lowering the photoelectric unit 72, 74 with respect to the template 70. This is accomplished in the following manner: Second shaft 116 has a gear 124 mounted on the end remote from knob 114 in meshed engagement with a rack 126 upon which light 72 and photoelectric cell 74 are mounted permitting the gap selection as described. The necessity for controls of the type described can be seen by referring to FIGS. 8 and 9 showing the track links. The gap on the outside of rail 62 is offset from the gap on the inside of rail 62. There is a similar gap offset in opposite rail 64. Successive links having the gaps described have complementary flange portions. The sleeve 68 and pin 66 extend between flange portions of the links and interconnect them. For this reason, it is desirable while maintaining the identical gap to cause the templates to interrupt the weld at the offset position when switching from the outside of the rail to the inside, or vice versa. This can be done by either advancing or retarding by turning knob 108 until pointer 118 marks off the number of increments necessary on scale 120 to adjust for the offset between these areas. This difference if advancing the controls will be the length of a link flange. Conversely, if the controls are to be retarded the offset would be the length of the mid-portion of the link.

Welding heads 44 of the normal commercial type are mounted on carriage 46 and operate in response to the templates 70. As welding heads of the type illustrated are commercially available it will suffice to say that one or more such heads 44 may be provided on carriage 46 with a spool 128 of welding wire mounted to automatically feed into each head. Flux containers and depositors 130 mounted on welders 44 have passages 132 connected to the electrode so that flux can be deposited directly over the arc of the welding unit, submerging the arc. It is particularly desirable in welding rails of track links that two heads 44 be mounted on the unit for relative transverse movement as shown in FIG. 2, one starting at the outside of rail 64 and one starting at the outside of rail 62, the rails being exactly opposite in gap offset such that as the units work towards the center of the rail they will follow exactly the same template pattern and gap advance or retard. The means for effecting relative transverse movement of the heads 44 may be of conventional design and are not shown.

If the construction illustrated in FIG. 10 is used wherein a plurality of templates 70 are employed, a groove 134 is machined the length of a bar 136 attached to frame member 26. A plate 138 is held in groove 134 by a series of spring clips 140 such that a slot is made wherein the templates 70 may travel along the length of frame member 26. Each of the templates, whether they be of the type illustrated in FIG. 10 or FIG. 11 are provided with front and rear bumpers 142, 144 respectively. When a track is initially placed in the welding bed 28 and clamped in place by clamps 146, the templates will be gathered at one end of the machine. For ease in explanation, let us assume that the templates are gathered at the left end of the machine as illustrated in FIG. 1. Either a manually operated or a solenoid operated template plunger 148 may be provided which will engage the extending finger 150 of the rear bumper of the farthest template to the left and will cause each of the templates in turn to bump against the other and move toward the right along the slot provided as gear 58 moves carriage 46 along rack 42. Template plunger 148 is manually disengaged from finger 150 of the rearmost template when the first gap is approached. This may also be done electrically through the use of a micro switch 152, illustrated in FIG. 1. Micro switch 152 is provided which rides down the track between the rails and is manipulated by the central portions of the sleeves 68 to energize the solenoid 154 releasing plunger 148 from finger 150 at the rear of template 70. In either case, the plunger 148 will engage finger 150 extending from rear bumper 144 of the next successive template. Placement of successive templates will repeat the operation throughout the length of the track to be welded. If the micro switch 152 is used it should be noted from FIG. 1 that the switch 152 can be folded out of the way once the template are distributed. The same type of operation could be used for material other than tracks having a configuration requiring gaps in the weld deposited.

One reason for indexing welding bed 28 as described earlier in the specification is to permit the edges of the rail to be rebuilt in the manner illustrated in FIG. 3. Another reason for indexing welding bed 28 is to permit flux to be dumped from the bed 28. For this purpose a flux screen 156 and catcher 158 is portably stationed under bed 28 on rollers 159 rolling on a base or floor 160 and preferably extends the length thereof. This receives the flux dumped from bed 28 as it is indexed, allowing reusable flux to be immediately sifted through the screen 156 and received in catcher 158. The fused flux caught on screen 156 which must be ground before reuse is dumped from screen 156 into a bin (not shown).

As the welding heads 44 make their pass down the track alternately welding and being interrupted, the operator may follow at some distance chipping the fused flux from the bead of weld deposited and brushing the area clean so that it is prepared for the next consecutive bead of weld to be deposited.

If sufficient wear has taken place on the track links so that the welding operation must be repeated to build the height of the rail, the gap will be increased by adjusting the position of the photoelectric unit 72, 74 with respect to the template 70 so that the duration of interruption is increased. The preferred type of template 70 illustrated in FIG. 10 has a straightedge at one side.

In FIGS. 8 and 9 the rails 62 and 64 are shown having layers 200, 201 and 202 of weld deposited thereon. Each layer is comprised of a plurality of successive beads and has a straightedge at one end of the rail. The opposite end of the rail has the successive layers offset from each other. This construction is necessary so that each link has sufficient room to pivot with respect to its adjacent links. The pattern described may be accomplished by lowering the photoelectric unit 72, 74 with respect to the template 70 so that the gap is increased as each successive layer is deposited. The preferred embodiment 70 of the template permits the stopping of the weld in a straight line because of the straightedge on the lefthand side of the template. The angular edge of the template permits the offsetting of successive layers, as the lowering of the photoelectric unit 72, 74 with respect to the template will increase the area of template 70 which interrupts the photoelectric unit.

The bumpers 142, 144 on templates 70 or 700 which are illustrated in FIGS. 10 and 11 are preferably formed of brass. Brass is used because it is non-magnetic for the reason that a large magnetic field is created by wires which extend over the top of carriage 46 and bring electricity to welding heads 44. Previous experiments with bumpers of magnetic materials show that they are magnetized by this field causing successive templates to stick together preventing proper template positioning.

It is of great value to paint both sides of the template 70 or 700 which extend above the slot preferably in black so that light reflections will not glance off of the templates 70 or 700 into the photoelectric cell 74 causing activation of the welding unit at an undesirable time. For this reason the photoelectric unit consisting of a light 72 and photocell 74 is located in the area between the downwardly extending portion of the carriage 46 and frame member 26, thereby preventing as much as possible natural light from entering the area around the photoelectric unit 72, 74.

Subject matter disclosed but not claimed herein is claimed in copending continuation applications Serial Nos. 152,827, filed November 16, 1961, and 154,369, filed November 22, 1961.

While I have shown and described certain present preferred embodiments of the invention and have illustrated certain present preferred methods of practicing the same it is to be distinctly understood that the invention is not limited thereto but may be otherwise variously embodied and practiced within the scope of the following claims.

I claim:

1. A welding positioner and manipulator comprising: an elongated bed, means for fastening in fixed position on the bed work to be welded, means supporting the bed for indexing rotation about its longitudinal axis, a machine frame member extending longitudinally over said bed, a welding head having an electrode and mounted on said frame member for movement longitudinally of said bed, means for supplying flux to submerge the weld, welding head controls including pattern means for sensing and for automatically controlling the pattern of weld metal deposited, a base and elongated flux catching and screening means entirely separate from the bed movably mounted on the base for generally horizontal movement between a position beneath the bed where such means are adapted to receive flux from the bed when the bed is rotated about said axis and a position relatively remote from the bed for delivery of the flux, reusable flux sifting through the screening means into the catching means.

2. A welding positioner and manipulator comprising: a reversibly indexable elongated welding bed rotatable through an arc of 360°, means for fastening in fixed position on the bed work to be welded, a machine frame member extending over the length of said welding bed, welding heads movably mounted on said frame member to move over said welding bed, a flux container and depositor attached to each of said welding heads and movable therewith, whereby a continuous supply of flux is available to be deposited over the arcs of said welding heads to submerge them, a base and elongated flux catching and screening means entirely separate from the bed movably mounted on the base for generally horizontal movement between a position beneath the bed where such means are adapted to receive flux from the bed when the bed is arcuately indexed and a position relatively remote from the bed for delivery of the flux, reusable flux sifting through the screening means into the catching means, said welding heads including template controls for establishing and automatically controlling the pattern of weld metal deposited.

3. Welding apparatus comprising an elongated bed, means for fastening in fixed position on the bed work to be welded, means supporting the bed for rotation about an axis extending longitudinally of the bed, welding means mounted for movement along the bed for welding work carried by the bed, means for supplying flux to the weld, a base and elongated flux catching means entirely separate from the bed movably mounted on the base for generally horizontal movement between a position beneath the bed where such means are adapted to receive flux from the bed when the bed is rotated about said axis and a position relatively remote from the bed for delivery of the flux.

4. Welding apparatus comprising an elongated bed, means for fastening in fixed position on the bed work to be welded, means supporting the bed for rotation about an axis extending longitudinally of the bed, a guide member extending longitudinally of the bed, a welding head having an electrode mounted for movement along the guide member for depositing weld metal on work carried by the bed, means for supplying flux to submerge the weld, a base and elongated flux catching and screening means entirely separate from the bed movably mounted on the base for generally horizontal movement between a position beneath the bed where such means are adapted to receive flux from the bed when the bed is rotated about said axis and a position relatively remote from the bed for delivery of the flux, reusable flux sifting through the screening means into the catching means.

References Cited in the file of this patent

UNITED STATES PATENTS

| | | |
|---|---|---|
| 1,559,453 | Pritner et al. | Oct. 27, 1925 |
| 2,164,567 | Burke | July 4, 1939 |
| 2,427,350 | Carpenter et al. | Sept. 16, 1947 |
| 2,529,111 | Steinberger | Nov. 7, 1950 |
| 2,602,869 | Peck et al. | July 8, 1952 |